A. M. Hills,
Lawn Mower.

No. 3,030. Reissued July 14. 1868.

Witnesses.
Thos Snoke
Wm. Spencer

Inventor.
A. M. Hills
Per Munn & Co.
Attorneys

UNITED STATES PATENT OFFICE.

AMARIAH M. HILLS, OF HOCKANUM, CONNECTICUT.

IMPROVEMENT IN LAWN-MOWERS.

Specification forming part of Letters Patent No. 73,807, dated January 28, 1868; Reissue No. 3,030, dated July 14, 1868.

*To all whom it may concern:*

Be it known that I, AMARIAH M. HILLS, of Hockanum, in the county of Hartford and State of Connecticut, have invented a new and Improved Lawn-Mower; and that the following description, taken in connection with the accompanying drawings hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

This invention relates to a new and improved device for mowing grass by hand, and is more especially designed for mowing lawns.

The invention consists in a novel manner of constructing the frame of the machine and mounting it on a roller, whereby the latter is made to have sufficient traction to drive, in the most efficient manner, the cutting device.

The invention also consists in a novel manner of applying the handle to the frame of the machine, whereby the latter may be pushed along by the operator without at all affecting the equilibrium of the machine on its roller.

The invention also consists in a novel and improved cutting device, which may be constructed at a very small cost, and still be strong, durable, and not liable to spring during the operation of cutting.

The invention further consists in a peculiar application of shoes to the device, whereby the height of the cut may be regulated as desired.

Figure 1:
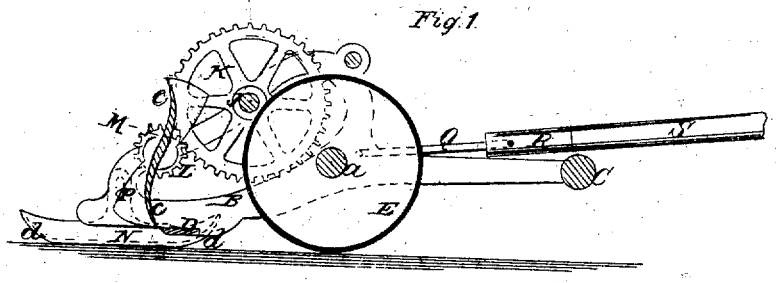
Figure 2:
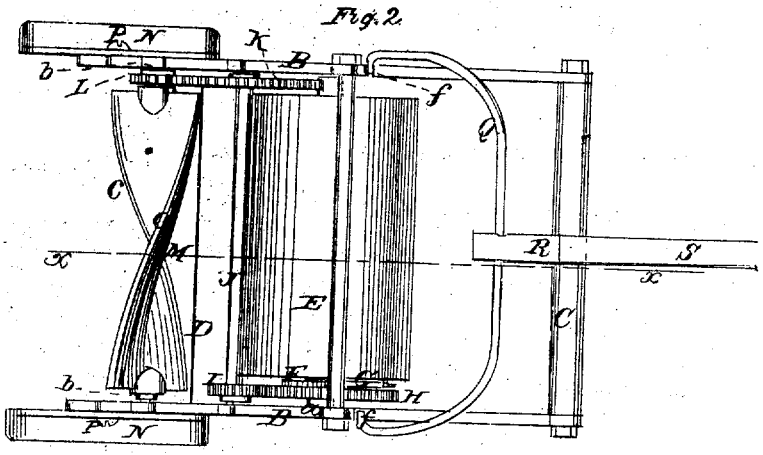
Figure 3:
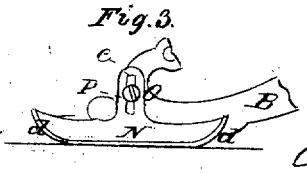

In the accompanying sheet of drawings, Figure 1 is a side sectional view of my invention, taken in the line *x x*, Fig. 2; Fig. 2, a plan or top view of the same; Fig. 3, a side view of one of the shoes pertaining to the same, and a portion of the framing to which the shoe is attached.

Similar letters of reference indicate corresponding parts.

The frame of the machine is composed of two side pieces, B B, connected at their front ends by a cross-bar, C, and connected near their rear ends by a fixed cutter-bar, D, which may be of wrought or cast iron, faced with steel at its upper surface. At the center of the frame there is a shaft, *a*, the side pieces B B serving as the bearings thereof. This shaft is allowed to turn freely in its bearings, and it has a roller, E, fitted loosely upon it. The shaft *a* has a ratchet-wheel, F, keyed firmly upon it, into which a pawl, G, attached to one end of the roller, catches, and causes the shaft to turn with the roller when the machine is shoved forward, the shaft not being turned when the machine is drawn backward. On the shaft *a* there is permanently keyed a toothed wheel, H, which gears into a pinion, I, on one end of a shaft, J, and on said shaft, near the opposite end, there is keyed a toothed wheel, K, which gears into a pinion, L, on one of the journals *b* of the cutter M. This cutter is of cast-iron, and has two or more spiral blades, *c*. Two blades are represented in the drawings, and that number will probably be sufficient. This spiral-bladed cutter, when the machine is shoved forward, has a rotary motion communicated to it from the roller E, through the medium of the gearing described, and the blades *c* are designed to work over the edge of the fixed cutter-bar D, as will be fully understood by referring to Fig. 1. To the front end of each side piece B there is attached a shoe, N. These shoes are rounded up at each end, as shown at *d d*, and at the centers of the shoes there are vertical portions O, which have oblong slots *e* in them, through which screws P pass into the side pieces B B, as shown clearly in Fig. 3.

This mode of attaching the shoes to the side pieces admits of their being adjusted so that their fixed cutter D may be at a greater or less distance above the surface of the ground, according to the height of cut required.

Q represents a bail-shaped rod, the ends of which are curved or bent inward, or toward each other, to form journals *f f*, which are fitted in holes in the side pieces B B of the framing, a little behind the ends of the roller-shaft *a*. This rod is provided at its center with a socket, R, to receive a wooden handle, S.

As the machine is shoved along, the cutter M, as it rotates, cuts the grass, the edges of the blades *c*, as they pass over the edge of the cutter-bar D, severing it. The journals *f f* of the bail-shaped rod Q are allowed to work freely in the side pieces B B, so that, in pushing the machine along, said rod will not interfere in the least with the equilibrium of the frame on the shaft of roller E.

This device will operate and cut grass quite close to trees and shrubs without injuring or cutting them. The rotary cutter M cannot spring—a result due to the material, (cast-iron,) and the spiral form in which it is cast. The whole device complete, ready for use, may be furnished at a small cost, and there are no parts liable to get out of repair or become deranged by use.

Having thus described my invention, I claim as new and desire to secure by Letters Patent—

1. The balanced frame on the roller E, in combination with the bail Q, to which the handle S is secured, all constructed and arranged substantially as and for the purpose set forth.

2. The horizontal cutter M, having the spiral cutters *c c*, when hung in front of the cutter D, in a frame which is adjustable upon the shoes N N, in the manner and for the purpose specified.

3. The combination of the frame, roller, shoes, cutting device, and handle, all constructed and arranged to operate in the manner substantially as and for the purpose set forth.

AMARIAH M. HILLS.

Witnesses:

ALEX. F. ROBERTS,

WM. F. MCNAMARA.